Dec. 3, 1963   M. J. TOLEGIAN   3,113,228
MAGNETIC COUPLING AND APPLICATIONS THEREOF
Filed March 27, 1959   3 Sheets-Sheet 1
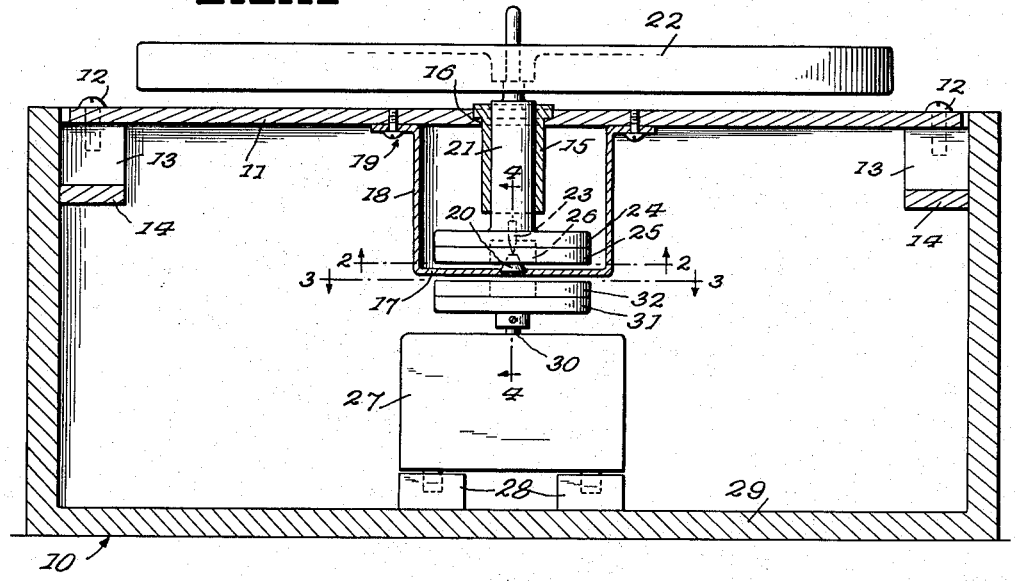
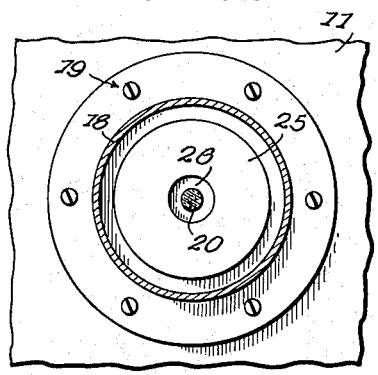
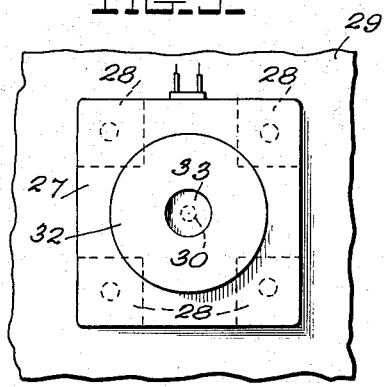
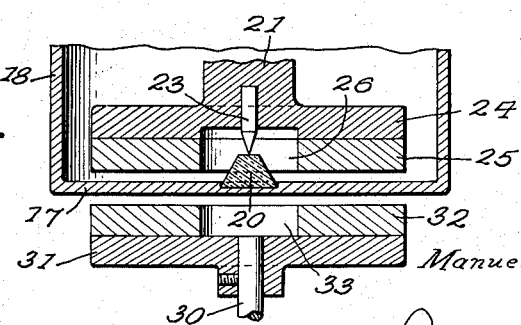
INVENTOR
Manuel J. Tolegian
BY Lowry Rinehart
ATTORNEYS

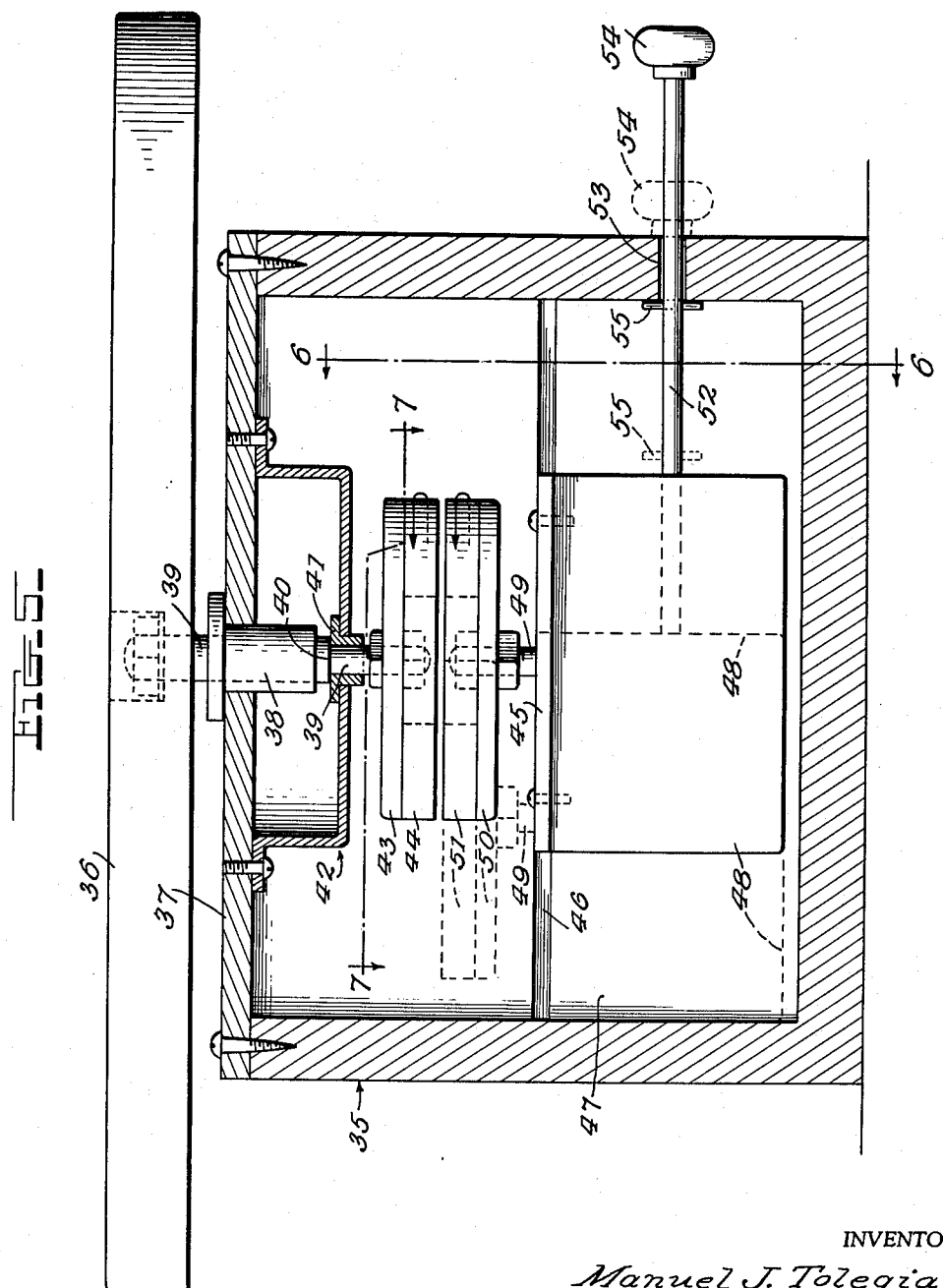

Dec. 3, 1963   M. J. TOLEGIAN   3,113,228
MAGNETIC COUPLING AND APPLICATIONS THEREOF
Filed March 27, 1959   3 Sheets-Sheet 3
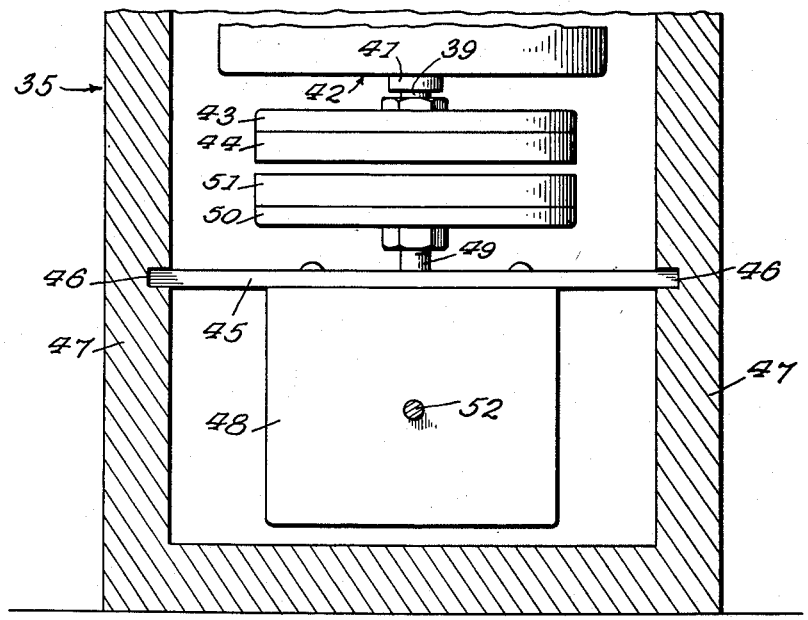
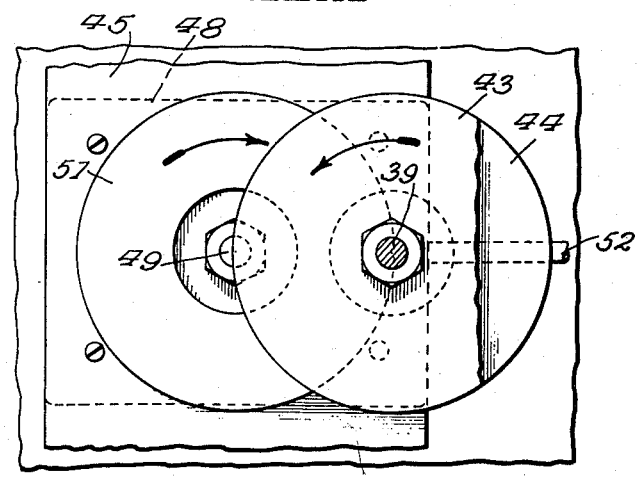
INVENTOR
*Manuel J. Tolegian*
BY *Lowry Rinehart*
ATTORNEYS

3,113,228
MAGNETIC COUPLING AND APPLICATIONS THEREOF
Manuel J. Tolegian, 3960 Glenridge Drive, Sherman Oaks, Calif.
Filed Mar. 27, 1959, Ser. No. 802,367
2 Claims. (Cl. 310—103)

The present invention relates to new and useful improvements in magnetic couplings, and in particular to such couplings as they are applied to drive rotatable shafts in sound equipment as, for instance, phonograph turn-tables, record-cutting equipment, tape recorders and other allied machines. In addition, the invention relates also to couplings employed in various ways in industrial machines in which silence of operation and vibration is a critical factor, and in which an important requirement is the reversing of driven shafts.

The principal object of the present invention is the provision of a magnetic coupling which, while it operatively connects a drive shaft and a driven shaft, provides also an optimum reduction of certain objectionable sounds, vibrations, noises, hums and rumbles originating from a variety of sources in sound equipment.

Another object of the present invention is the provision of a pivot-type bearing and housing which accommodates the coupling and which reduces to optimum requirements certain objectionable mechanical and electrical noises.

A further object of the invention is the provision of a magnetic frictionless coupling in which the coupling components operate in complete silence.

A still further object of the invention is the provision of a magnetic coupling in which disk-type permanent magnets, preferably ceramic magnets, are employed and in which the magnets are relatively shiftable in such a manner that a reversing coupling may be achieved. This feature of the invention thus provides a positive coupling between independently rotatable shafts, reverses the direction of rotation of the driven shaft when preferred, and produces a reversible coupling which is frictionless, inexpensive in construction and silent in operation.

Heretofore, very useful phonograph and other turn-tables and mechanical devices employing magnetic couplings have been devised and patented. In all of the devices in which permanent magnets have been used, however, magnets of the widely known U-type design have been employed, as distinguished from the circular, disk-type magnets employed in the present invention. Thus, in accordance with this conventional U-shaped magnet design, inventors have had to comply with the two-pole characteristics of these magnets and constructed machines and couplings to conform to said two-pole design. As a consequence, complicated and expensively produced components have been required to build these machines and to adapt magnets for them for the purpose of devising a coupling. In addition, the design, the components used, and the magnets of U-type applied in the machines are such that the optimum desirability for the reduction of objectionable sounds is far from being satisfactory in modern requirements of fidelity in sound reproduction. Such difficulties, however, are overcome by the magnets which are employed in the present invention which generate very negligible amounts of stray magnetic energy in the coupling, whereas U-type magnets produce considerable amounts of stray magnetic force and create a larger field of magnetic flux and, as a consequence are readily "picked up" by the sound equipment, causing disturbing "thumping" or "wow" sounds during the rotation and reproduction of records on a turn-table. In addition, in turn-tables heretofore disclosed, rumble noises may be produced by their use of ball bearings and other objectionable sounds may be caused by their use of belts, pulleys, cones and pins, and by clutch mechanisms rubbing or striking metal parts.

With the present invention, the above noted difficulties are avoided by improvements made in the driving elements of the turn-table, by the improvements made in the arrangement and placement of components in the structure including the turn-table, and by the employment of disk or wafer-type permanent ceramic magnets in the table driving coupling, which improves the operating efficiency of the coupling as well as provides greater silence of operation. The disk-type ceramic magnets, together with their circular design, offer several other important advantages over U-type magnets; they do not use critical materials and are, therefore, considerably less expensive than the U-type metallic magnets; they are relatively small and hence conserve space; they are available in flat-planed disks and are thus more in conformance with the circular design of turn-tables than are the U-shaped magnets; they possess, by weight and volume, three to five times the pulling or magnetic flux power as compared to U-type permanent magnets and are thus more efficient for couplings having an air gap; they possess a greater holding power or permanence of magnetic energy than do U-type metallic magnets and lose their energy only at the rate of about 5% in a century, and consequently, they are less likely to dissipate wanted energy for a coupling. For such reasons and those described above, among others, the incorporation of permanent ceramic magnets in the present invention makes possible a more efficient coupling, simpler and less expensive in design, and easier to construct, and provides the optimum of silence in operation.

With reference to the reversible aspect of the invention it finds its principal advantages for use in various industrial machines in which reversing operations are critical and important and in which friction, vibrations, noises, hums or other sounds or vibrations are harmful to the machines or detrimental to the products handled by these machines. The coupling in the present invention therefore may be applied to machines in which articles of great delicacy and fragility are produced, and in which mechanical shock or the jarring of coupled shafts during reversing operations are detrimental to the machines or the articles produced as, for example, delicate articles created in motor-driven jeweler's lathes, or in the operation of sensitive instruments requiring vibration-free action.

With the above and other objects in view that will become apparent as the nature of the invention is better understood, the same consists in the novel form, combination, and arrangement of parts hereinafter more fully described, shown in the accompanying drawings, and particularly pointed out in the appended claims.

In the drawings:

FIG. 1 is a vertical sectional view, partly in elevation, showing a record player or the like embodying the invention;

FIGS. 2 and 3 are horizontal sectional views on lines 2—2 and 3—3, respectively, of FIG. 1;

FIG. 4 is an enlarged vertical sectional view on line 4—4 of FIG. 1;

FIG. 5 is a vertical sectional view, partly in elevation, showing a reversible article display device embodying the invention, the driving motor and magnet being shown in reversing position in dotted lines;

FIG. 6 is a vertical sectional view on line 6—6 of FIG. 5; and

FIG. 7 is a horizontal sectional view on line 7—7 of FIG. 6 but showing the driving motor and magnet in the position which is shown by dotted lines in FIG. 5.

While the constructions shown in the drawings will be rather specifically described, they are to a large extent illustrative rather than limiting.

In FIGS. 1 to 4, a construction is shown which is well adapted to such sound equipment as record cutters and players. A casing 10 is provided; and this casing has a yieldably mounted top 11. This top is shown as secured by screws 12 upon rubber cushion blocks 13; and said blocks are secured upon ledges 14 carried by walls of the casing. This casing may be assumed to be rectangular and having one of the cushion blocks 13 at each corner.

A vertical bearing sleeve 15 is secured in an opening 16 in the casing top 11 and projects downwardly from the latter. Below the bearing sleeve 15, there is a flat horizontal bearing-supporting plate 17. This plate 17 is secured to the lower end of a cylindrical wall 18 which is suitably secured at 19 to the casing top 11. The plate 17 rigidly carries a bearing block 20 which may be of hardened steel or of a material such as those used for jewel-type bearings in watches and the like.

A vertical shaft 21 extends rotatably through the bearing sleeve 15 and mounts a turn-table 22 over the casing top 11. This shaft 21 is ground and lapped to so accurately fit it in the sleeve 15 that no lateral slap can occur. The lower end of the shaft 21 is provided with a central hardened steel, bearing needle 23, the point of which rests upon the bearing block 20.

The lower end of the shaft 21 is provided with a horizontal disk 24 which is concentric with said shaft; and a disk-type, ceramic, permanent magnet 25 is secured to the lower side of said disk 24. The magnet 25 has a central opening 26 which receives the bearing block 20; and the magnet 25 may therefore be located close to the plate 17.

An electric motor 27 is mounted upon rubber cushion blocks 28 secured upon the bottom 29 of the casing 10. The motor shaft 30 projects upwardly and is axially aligned with the shaft 21. The upper end of the motor shaft 30 carries a disk 31 which is concentric therewith, and a disk-type ceramic, permanent magnet 32 is secured upon the upper side of said disk 31. This magnet 32 is close to the plate 17, is of the same diameter as the magnet 25, and may be downwardly spaced about ⅛″ from said magnet 25. Like the magnet 25, the magnet 32 has a central opening 33. Each of the magnets may have any appropriate number of equally distributed poles, eight being preferable.

When the lower magnet 32 is driven by the motor 27, it drives the upper magnet 25 and this magnet in turn drives the table 22. Not only is the air-gap magnetic coupling formed by the magnets and associated elements, more efficient as a shaft driver than its predecessors, but it overcomes prior difficulties above enumerated.

In FIGS. 5, 6 and 7, a display device is shown having a casing 35 and a turn-table 36 over the casing top 37. The driving means for the turn-table 36 is very similar to that for the above described turn-table 22 but includes provision for driving said turntable 36 either clockwise or counterclockwise.

The casing top 37 carries a bearing sleeve 38 for the turn-table shaft 39 and this shaft has a shoulder 40 resting on another bearing 41. Suitable mounting means 42 for the bearing 41 is secured to the casing top 37. The lower end of the shaft 39 is provided with a disk 43 to the lower side of which a disk-type, ceramic permanent magnet 44 is secured.

A motor-carrying plate 45 is disposed horizontally in the casing 35 below the magnet 44. The ends of this plate 45 are slidably engaged with track grooves 46 in two opposed side walls 47 of the casing 35. The plate 45 rigidly carries an electric motor 48 the shaft 49 of which projects upwardly. This motor shaft 49 is provided with a disk 50 upon which a disk-type ceramic, permanent magnet 51 is secured for coaction with the magnet 44.

When the axes of the two shafts 39 and 49 and their respective magnets 44 and 51 are aligned as seen in FIGS. 5 and 6, clockwise rotation imparted to the lower magnet 51 by the motor 48, will drive the upper magnet 44 and the turntable 36 clockwise. However, by shifting the motor 48 to a position in which its shaft 49 is laterally offset from the shaft 39, as dotted in FIG. 5 and shown in FIG. 7, the two magnets are brought into radially overlapped relation and the clockwise rotation of the lower magnet 51 will cause counterclockwise rotation of the upper magnet 44 and the turn-table 36.

A rod 52 is secured to the motor 48 and extends through an opening 53 in one wall of the casing 35 for manually shifting said motor to either position desired. The outer end of the rod has a knob 54 for moving it as required; and said knob may well strike the casing to limit the movement of the motor to shaft reversing position. A stop pin 55 is shown extending through the rod 52 to strike the casing and limit the movement of the motor back to the position in which unidirectional rotation of the two shafts 39 and 49 will occur.

From the foregoing, it will be seen that novel provision has been disclosed for attaining the desired ends. While only two applications of the magnetic coupling have been disclosed, it may be embodied in numerous other devices. Also, it is to be understood that other variations may well be made within the scope of the invention as claimed.

What is claimed is:

1. In a device of the class described, a casing having a top, bearing means carried by said top, a vertical table-carrying shaft extending through said bearing means, said shaft having a disk secured to and coaxial with its lower end, a disk-type permanent magnet secured to the lower side of said disk and coaxial with the latter, an electric motor in said casing below said magnet and having an upwardly projecting shaft, means shiftably mounting said motor for movement from one position in which the motor shaft is aligned with said table-carrying shaft to another position in which the motor shaft is laterally offset from said table-carrying shaft, the upper end of said motor shaft being provided with a disk concentric with said motor shaft, a second disk-type permanent magnet secured upon said disk of said motor shaft and spaced slightly below the first mentioned disk-type permanent magnet, and means connected with said motor for shifting it from said one position to said other position and vice versa; said motor, when in said one position, causing rotation of said table-carrying shaft in the same direction as the motor shaft, due to the aligned axes of said disk-type magnets; said motor, when in said other position, causing rotation of said table-carrying shaft in the opposite direction, due to the offset relation then existing between the two magnets.

2. In a reversing drive coupling for turntables, wherein said turntable includes a housing, a motor in said housing having a drive shaft, and a rotatable platform having a driven shaft turned by said motor, the combination therewith of a unitary disk type permanent magnet secured to and concentric with said drive shaft, a second unitary disk type permanent magnet secured to and concentric with said driven shaft, said magnets being in spaced apart relationship in the direction of the axes of said shafts, said shafts being unidirectional and normally in axial alignment, and means for selectively shifting said motor and said drive shaft laterally in said housing to move said magnets into radial overlapping relationship whereby the direction of rotation of said driven shaft will be reverse to that of said drive shaft.

References Cited in the file of this patent

UNITED STATES PATENTS

| | | |
|---|---|---|
| 454,832 | Bennett | June 23, 1891 |
| 1,333,415 | Henry | Mar. 9, 1920 |
| 1,878,534 | Ovington | Sept. 20, 1932 |
| 1,880,936 | Else | Oct. 4, 1932 |
| 2,300,778 | Cornwell | Nov. 3, 1942 |
| 2,366,562 | Schug | Jan. 2, 1945 |
| 2,640,364 | Nelson | June 2, 1953 |
| 2,722,617 | Cluwen | Nov. 1, 1955 |
| 2,774,896 | Reynst | Dec. 18, 1956 |
| 2,885,126 | Hudson | May 5, 1959 |